United States Patent Office 3,578,632
Patented May 11, 1971

3,578,632
CURING POLYEPOXIDES WITH MIXED CATALYSTS
Alfred Kuhlkamp, Hofheim, Taunus, and Edgar Fischer and Ernst Nolken, Frankfurt am Main, Germany, assignors to Farbwerke Hoechst Aktiengesellschaft vormals Meister Lucius & Bruning, Frankfurt am Main, Germany
No Drawing. Filed Aug. 8, 1968, Ser. No. 751,031
Claims priority, application Germany, Aug. 23, 1967,
F 53,308
Int. Cl. C08g 30/10
U.S. Cl. 260—47                                    8 Claims

ABSTRACT OF THE DISCLOSURE

Liquid polyepoxides or solvent solutions of solid polyepoxides having 2 to 10 epoxy groups and preferably epoxide equivalents of 100 to 300 are cured without application of external heat by mixing them with a catalyst system consisting essentially of a mixture of a Lewis acid and a phosphorus compound of the formula

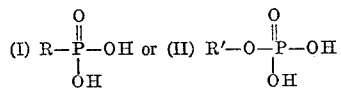

in which R and R' represent alkyl, aryl, cycloalkyl, alkylaryl, aralkyl, alkoxyalkyl, alkoxyaryl, hydroxyalkyl, hydroxyaryl, hydroxyaralkyl or alkenyl. Epoxide resins are thus obtained by a room temperature cure which exhibit good resistance to alkalies. The products may be used for making glass fiber reinforced articles and for coating such materials as paper, metals, wood, textiles and plastics.

---

The present invention relates to a process for curing epoxide resins by means of Lewis acids and phosphonic acids or phosphoric acid monoesters.

Epoxide resins are cured in most cases with the aid of amines, polyvalent phenols or dicarboxylic anhydrides, such as maleic anhydride, phthalic anhydride or alkenylsuccinic anhydride. The amines used for this purpose may be monofunctional as well as polyfunctional and contain primary, secondary or tertiary amino groups. As curing agents there have also been proposed polyamines, organic or inorganic acids such as carboxylic acids, sulfonic acids, phosphoric acid, phosphoric acid monoesters and phosphonic acids as well as Lewis acids, for example boron trifluoride and the complex compounds thereof with ethers, alcohols, phenols, carboxylic acids and amines.

Curing with amines and dicarboxylic anhydrides is normally performed with the supply of heat and to obtain products having optimum properties, after the exothermal curing with aliphatic amines, an after-curing by further heating is necessary. The curing of epoxide resins with phosphoric acid, phosphoric acid monoesters, phosphonic acids and Lewis acids, such as boron trifluoride and the complex compounds thereof with ethers, alcohols, phenols, carboxylic acids and carboxylic esters is likewise exothermal.

When epoxide resins are cured by means of, for example, $BF_3[O(C_2H_5)_2]$ curing is not complete at 30° C., even if the complex compound is dissolved in a further amount of diethyl ether for a better miscibility with the resin. After 15 minutes only 43% and after 60 minutes 60% of the epoxide groups have undergone reaction. This incomplete reaction is attributed to the rapid increase in viscosity as the reaction proceeds owing to the formation of the three-dimensional network. the mobility of the polymer chains is thereby strongly reduced and the degree of curing commences to be dependent on the possibility of diffusion of the polymer molecules. Only by further heating at 120° C. a complete conversion is ensured and products having the good properties are obtained.

When epoxide resins are reacted with phosphoric acid monoesters or phosphonic acids curing is exothermal and a complete reaction of the epoxide groups can be attained. The cured products are distinguished by good mechanical properties and a high thermostability. But compared with the products cured with amines they have a poor resistance to solvents and to alkalies.

The present invention provides a process for curing epoxide resins, which comprises using as curing agent a mixture consisting of a Lewis acid with at least one phosphorus compound of the general formula

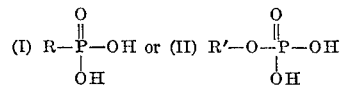

in which R and R' each stand for an alkyl group containing 1 to 10 preferably 1 to 5 carbon atoms or an aryl group, for example a phenyl group; or a cycloalkyl group, for example a cyclohexyl group; or an alkylaryl group, for example a methylphenyl group; or an arylalkyl group, for example a phenylmethyl or benzyl group; or an alkoxyalkyl group, for example a methoxymethyl group; or an alkoxyaryl group, for example an ethoxyphenyl group; or a hydroxyalkyl group, for example a hydroxyethyl group; or a hydroxyl group, for example a hydroxyphenyl group; or a hydroxyaralkyl group, for example an α-hydroxybenzyl group; or an alkenyl group, for example a vinyl group, the aforesaid groups possibly being substituted by halogen atoms, preferably chlorine or bromine atoms.

The process of the invention yields products of improved resistance to alkalies without supply of external heat and with a complete conversion of the epoxide groups.

Suitable phosphorus compounds are, for example, vinyl-, methyl-, ethyl-, 2-chloroethyl-, 1,2-dichloroethyl-, propyl-, butyl-, hydroxymethyl-phosphonic acid, 1-hydroxyethyl-phosphonic acid, 2-hydroxypropane-2-phosphonic acid, α-hydroxybenzyl-phosphonic acid, phenyl-phosphonic acid, or the monoalkyl-, monocycloalkyl-, and monoaryl-esters of phosphoric acid, for example the methyl-, ethyl-, propyl-, isopropyl-, n-butyl-, isobutyl-, tert-butyl-, methoxyethyl-, butoxyethyl-, phenyl-, 2-methylphenyl-, 3-methylphenyl-, 2,4,6-trichlorophenyl-, or 2,4,6-tribromophenylester. Especially good results are obtained with phosphoric acid monomethyl ester and phosphonic acids, preferably vinyl-phosphonic acids and alkyl-phosphonic acids.

The phosphoric acid monoesters may be contaminated with a lesser or larger proportion of the corresponding diester as obtained in the reaction of phosphorus pentoxide with alcohols or phenols. The aforesaid phosphonic acids and phosphoric acid monoesters can be used in an amount up to the equivalent amount, calculated on the epoxide resin, that is to say one hydroxy equivalent of the phosphorus compound for each epoxide equivalent. To obtain cured resins with satisfactory properties it proved advantageous, however, to use the phosphorus compounds in amount below equivalent, preferably 0.2 to 0.6 hydroxy equivalent per epoxide equivalent.

As catalysts, which are used in combination with the aforesaid phosphorus compounds as curing agents, there are mentioned halide Lewis acids, such as boron trifluoride, tin tetrachloride, antimony pentachloride, phosphorus pentachloride, and antimony pentafluoride, preferably the addition compounds of boron trifluoride with aromatic amines having a $pK_b$ value of 9 to 16, for example diphenyl amine, 2,4-dichloroaniline, 2-chloroaniline, 3-chloroaniline, o-phenylene diamine, and p-aminobenzoic acid ethyl ester. The use of the aforesaid complex compounds of boron trifluoride with aromatic amines is especially advantageous because the working life of the cured mixture can be regulated by the basicity of the amine. The complex compounds of boron trifluoride with aromatic amines are substances that are solid at room temperature. To facilitate their handling they may be used in the form of solutions in ethers, such as diethyl ether, diisopropyl ether, dioxane, ethylene glycol dimethyl ether, diethylene glycol dimethyl ether, and diethylene glycol diethyl ether; or in alcohols such as methanol, ethanol, n-propanol, i-propanol, butyl alcohol, hexyl alcohol, diethylene glycol monobutyl ether, ethylene glycol, diethylene glycol, triethylene glycol and butanediol-1,4; or in ketones such as acetone, methylethylketone, and methylisobutylketone; and in weakly basic aromatic amines, such as 2-chloroaniline, or 3-chloroaniline. The specified liquids may also be used as solvents or complexing agents for the aforesaid catalysts that are gaseous at room temperature, for example boron fluoride or phosphorus pentafluoride. It is most advantageous, however, to use the specified phosphorus compounds as solvents for the Lewis acid catalyzing the curing of the epoxide resins, because the cured products are thus free from solvent residues.

The catalysts are generally used in an amount in the range of from 0.01 to 5, preferably 0.1 to 3 mol percent, calculated on the average epoxide equivalent of the resin used. When the catalyst is used in the form of a solution it preferably contains 10 to 50% of catalyst, calculated on the weight of the solution.

By the process of the invention epoxide resins are cured having several, preferably 2 to 10 1,2-epoxy groups in the molecule, for example reaction products of epichlorohydrin with polyhydric alcohols, advantageously 2,2-bis-(4-hydroxyphenyl)-propane and especially with mono- and polynuclear, polyhydric phenols. It is likewise possible to use di- and polyglycidyl esters. There may also be used compounds obtained by introducing epoxy groups into di- and polyolefins, dienes, cyclic dienes and diolefinicially unsaturated carboxylic acid esters. Alternatively, telomers and cotelomers containing glycidyl ether and/or glycidyl ester groups may be used. Still further, it is possible to replace 1 to 60% by weight, preferably 5 to 30% by weight of the epoxide resins by other cationically polymerizable compounds. Compounds of this type are, for example, cyclic ethers such as propylene oxide, epichlorohydrin, phenylglycidyl ether, 3,3-bis(chloromethyl)-oxacyclobutane, trioxan and tetrahydrofurane. It is appropriate to cure epoxide resins that are liquid at room temperature and contain 100 to 300 epoxy equivalents. It is likewise possible to use solid epoxide resins or resin having higher epoxy equivalents provided that they can be obtained in the liquid state by adding solvents or comonomers.

Curing is brought about by adding at room temperature a mixture of one or several of the specified phosphorus compounds and the Lewis acid to the epoxide resin. The components to be mixed may have identical or different temperatures, in the range of, for example, from 5 to 45° C., preferably 10–35° C.

To the epoxide resin or the curing mixture dyestuffs and fillers, such as wood, wool, talcum, asbestos, kieselguhr, aluminum powder, soot, iron oxide or titanium dioxide, may be added.

The resin can be mixed with the curing mixture by means of a suitable stirrer, preferably a rapid stirrer. It is likewise possible, however, to use special apparatus for mixing, for example a spray gun with separate inlets for the resin and the curing mixture, in which gun the components are mixed and then applied to the surface to be coated.

Normally, the mixture can be stirred for 10 seconds to 3 minutes before curing sets in with increase in temperature, this being sufficient for a thorough homogenization.

The mixture to be cured is then transferred into a mould, cast to a film or sprayed onto the most different materials, such as metals, ceramics, textiles, paper, glass wool, or fiber fleeces.

The pot life of the mixture to be cured depends on the epoxide resin used, the catalyst and the starting temperature of the individual components. The reaction mixture reaches its maximum temperature normally after 20 seconds to 10 minutes and the cross-linking reaction which yields the solid cured product is substantially terminated after 5 minutes to 1 hour even at room temperature.

As compared with known processes in which preferably liquid epoxide resins are cured at room temperature with Lewis acids without supply of external heat in the presence of special solvents or plasticizers, the process of the invention is distinguished by its exothermal course, the high polymerization speed, a reaction that is complete within a few minutes and by the fact that the phosphorus compounds used are incorporated into the resin by polyaddition with the epoxide groups so that the cured products are free solvent and exuding plasticizer and after-curing or drying is not necessary.

When the specified phosphonic acid derivatives are used, the cured epoxide resins have self-extinguishing properties and an especially good adhesiveness on the most different materials such as steel, aluminum, card board, stone, ceramics, and plastic materials. In the form of coatings on metal they give an effective protection against corrosion and rusting.

The products produced by the process of the invention can be used for enamelling processes, consolidation of fleeces, for making glass fiber reinforced articles, bonding and impregnating the most different materials, and for coating textiles, paper, metals, wood and plastic materials.

The coatings are distinguished by a high hardness, toughness and gloss, as well as a high resistance to the action of acids, bases, and organic solvents. Colorations as often observed with resins cured with amines do not occur. When the products are used for coatings which shall give a good protection against rust it is advantageous to use the phosphorus compound in an amount above the equivalent amount so that free acid groups are still available for reacting and adhering to the metal.

The following examples serve to illustrate the invention but they are not intended to limit it thereto.

Example 1 (according to the invention)

100 grams of an epoxide resin having a molecular weight of 400, an epoxide equivalent of 190 and a viscosity of 11,800 centipoises in a Hoeppler viscosimeter at 25° C., which resin had been prepared from epichlorohydrin and 2,2-bis(4-hydroxyphenyl)-propane, were stirred at 25° C. with a solution of 0.75 ml. of $$BF_3[O(C_2H_5)_2]$$

in 11.4 grams of vinylphosphonic acid. When the exothermal polymerization had started a film was cast on a metal sheet. Without subsequent heating a hard film having a good toughness and adhesiveness was obtained. The infrared spectrum revealed that the epoxide groups had reacted quantitatively. The film was insoluble in cyclohexanone and in toluene and resistant to sodium hydroxide solution of 5% strength.

Comparative Example 1

The experiment was carried out as described in the preceding example but without addition of vinylphosphonic acid; on stirring a homogeneous mixture of epoxide resin and  could not be obtained.

Comparative Example 2

The experiment was carried out as described in comparative Example 1, with the exception that the boron trifluoride ether complex compound was homogeneously mixed with the epoxide resin in the form of a solution in diethyl ether. The resin-curing agent mixture was cast to a film in which, as resulted from the infrared spectrum, the epoxide groups had not completely reacted even after one day at room temperature and after evaporation of the diethyl ether. The reaction could only be completed by heating the film at 120° C.

Comparative Example 3

Curing was performed as described in Example 1, but without the addition of boron trifluoride etherate. The product obtained was soluble in cyclohexanone. The same result was obtained with the use of an equivalent amount of vinylphosphonic acid, i.e. 28.5 grams per 100 grams of resin, and by after-curing the product at 160° C. The cured resins thus obtained had a poor resistance to dilute alkalies.

Example 2 (according to the invention)

100 grams of epoxide resin as defined in Example 1 were stirred with a solution of 1 cc. of boron trifluoride etherate in 16.2 grams of phosphoric acid monobutyl ester and the mixture was cast to a film. A hard clear film was obtained having a good thermostability and a good resistance to alkalies and organic solvents.

Comparative Example 4

The experiment was carried out as described in Example 2 but without addition of boron trifluoride etherate. The applied film was cured for 30 minutes at 150° C. It was tough and insoluble in toluene, but not resistant to sodium solution of 5% strength.

What is claimed is:

1. In a process for curing polyepoxides having 2 to 10 1,2-epoxy groups with a curing agent and without the application of external heat, the improvement which comprises using a curing agent consisting essentially of a mixture of 0.01 to 5 mol percent, based on the average epoxide equivalent of the polyepoxide, of a halide Lewis acid catalyst or a boron trifluoride aromatic amine complex having a pK$_b$ value of 9 to 16 and up to one hydroxy equivalent for each epoxide equivalent of a phosphorus compound of the formula

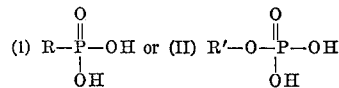

in which R and R' represent alkyl, aryl, cycloalkyl, alkylaryl, aralkyl, alkoxyalkyl, alkoxyaryl, hydroxyalkyl, hydroxyaryl, hydroxyaralkyl or alkenyl.

2. The process of claim 1, wherein the phosphorus compound is vinyl-, methyl-, ethyl-, 2-chloroethyl-, 1,2-dichloroethyl, propyl, butyl, hydroxymethyl-, 1-hydroxyethyl-, 2-hydroxy-propane-2-, α-hydroxybenzyl-phosphonic acid, or methyl-, ethyl-, propyl-, isopropyl-, n-butyl-, isobutyl-, tert-butyl-, methoxyethyl-, butoxyethyl-, phenyl-, 2-methylphenyl-, 3-methylphenyl-, 2,4,6-trichlorophenyl-monoester of phosphoric acid.

3. The process of claim 1, wherein the Lewis acid is a complex compound of boron trifluoride with aromatic amines having a pK$_b$ value of 9 to 16.

4. The process of claim 1, wherein 0.1 to 3 mol percent of Lewis acid is used, calculated on the average epoxide equivalent of the resin.

5. The process of claim 1, wherein the phosphorus compound is used in an amount such that 0.2 to 0.6 hydroxyl equivalents are present per epoxide equivalent.

6. Cured epoxide resins having a good resistance to alkalies obtained by the process claimed in claim 1.

7. A process according to claim 1 wherein the polyepoxide is a reaction product of epichlorohydrin and 2,2-bis-(4-hydroxyphenyl)-propane and the curing agent is a mixture of boron trifluoride etherate and vinylphosphonic acid.

8. A process according to claim 1 wherein the polyepoxide is a reaction product of epichlorohydrin and 2,2-bis(4-hydroxyphenyl)-propane and the curing agent is a mixture of boron trifluoride etherate and phosphoric acid monobutyl ester.

References Cited
UNITED STATES PATENTS

| | | | |
|---|---|---|---|
| 2,732,367 | 1/1956 | Shokal | 260—47EpC |
| 2,924,580 | 2/1960 | Phillips et al. | 260—47EpC |

WILLIAM H. SHORT, Primary Examiner

T. E. PERTILLA, Assistant Examiner

U.S. Cl. X.R.

117—124, 127, 148, 155, 161; 260—2, 37